(12) United States Patent
Higgins (10) Patent No.: US 7,853,195 B2
(45) Date of Patent: Dec. 14, 2010

(54) ADAPTIVE RF CANCELLER SYSTEM AND METHOD

(75) Inventor: Robert P. Higgins, Seattle, WA (US)

(73) Assignee: The Boeing Company, Chicago, IL (US)

( * ) Notice: Subject to any disclaimer, the term of this patent is extended or adjusted under 35 U.S.C. 154(b) by 635 days.

(21) Appl. No.: 11/845,962

(22) Filed: Aug. 28, 2007

(65) Prior Publication Data

US 2009/0061808 A1 Mar. 5, 2009

(51) Int. Cl.
*H04K 3/00* (2006.01)
*H04B 15/00* (2006.01)

(52) U.S. Cl. .................. 455/1; 455/63.1; 455/114.2
(58) Field of Classification Search .............. 455/1, 455/63.1, 114.2, 114.3, 296, 67.11, 67.13; 342/16, 14
See application file for complete search history.

(56) References Cited

U.S. PATENT DOCUMENTS

| | | | | |
|---|---|---|---|---|
| 5,757,312 | A * | 5/1998 | Szmurlo et al. | 342/159 |
| 6,650,271 | B1 * | 11/2003 | Simone et al. | 342/16 |
| 7,113,780 | B2 * | 9/2006 | McKenna et al. | 455/431 |
| 7,161,976 | B2 * | 1/2007 | Sano | 375/148 |
| 7,617,099 | B2 * | 11/2009 | Yang et al. | 704/228 |
| 2008/0175593 | A1 * | 7/2008 | Li | 398/116 |

OTHER PUBLICATIONS

Kuo, Sen M. and Morgan, Dennis R. "Active Noise Control: A Tutorial Review", IEEE, vol. 87, No. 6, Jun. 1999, pp. 943-973.
Glentis, George-Othon; Berberidis, Kosta and Theodoridis, Sergios. "A Unified View Efficient Least Squares Adaptive Algorithms for FIR Transversal Filtering", IEEE Signal Processing Magazine, Jul. 1999, pp. 13-40.
Widrow, Stearns. "Adaptive Signal Processing", The LMS Algorithm, Chapter 6, Prentice Hall, 1995, pp. 99-114.

* cited by examiner

*Primary Examiner*—Sonny Trinh
(74) *Attorney, Agent, or Firm*—Harness, Dickey & Pierce, P.L.C.

(57) ABSTRACT

An adaptive electromagnetic wave canceling system and method for canceling an electromagnetic interference (EMI) signal generated from an EMI signal source, from a broadband signal being received by a receiver. In one implementation an adaptive canceller subsystem is used that directly receives the EMI signal and a sample of the broadband signal, in which the sample includes an EMI signal component. A time delay stage is incorporated to delay the broadband signal before it is received by the receiver. The adaptive canceller subsystem generates a correction signal that is an inverse of the EMI signal component. The correction signal is applied to the broadband signal to effectively cancel the EMI signal component therefrom before the broadband signal is received by the receiver. In one implementation an automatic gain control is implemented that automatically adjusts the adaptive canceller subsystem to a level of the sample broadband signal, to thus form a closed loop EMI canceling system.

16 Claims, 6 Drawing Sheets

FIG 7
FREQUENCY
ERROR SIGNAL PSD

FIG 8
TIME INDEX
CHANNEL MODEL

ADAPTIVE RF CANCELLER SYSTEM AND METHOD

FIELD

The present disclosure relates to systems and methods that deal with removing interfering signals from a received electromagnetic wave signal, and more particularly to a system and method for canceling an electromagnetic interference signal from a received electromagnetic wave communications signal.

BACKGROUND

The statements in this section merely provide background information related to the present disclosure and may not constitute prior art.

Presently, some military aircraft, for example the EA-18G aircraft, carry a jamming pod that transmits a high power, electromagnetic (EM) wave jamming signal, that can occupy a relatively large bandwidth (Greater than 250 MHz). When communicating with the aircraft, the obvious solution is to use a frequency band outside the band where the jammer is operating. However, given tactical and interoperability considerations, it is sometimes necessary to be able to communicate using EM wave signals, with such an aircraft using the standard communications system carried onboard the aircraft, which may be operating in the frequency band where the jammer is transmitting a high power EM wave signal.

However, when a mobile platform equipped with electromagnetic wave jamming equipment is transmitting its jamming signal in the communications receive band, the interference-to-signal ratio is very large, and the communication signal may be drowned out by the jamming signal. Often, the jamming signal may be many orders of magnitude greater than the signal being received in the communications receiver.

There have been attempts at ameliorating the impact of an electromagnetic wave jamming signal for other narrow-band communications signals in other frequency bands. However, there is presently no suitable solution for a wide-band communications signal. The adaptive RF canceller of the present invention has a heritage in the field of acoustic noise canceling applications. However, there are two primary issues that must be dealt with in the wideband RF domain that are not issues in the acoustic domain. The bandwidth in the acoustic domain is typically about 20 kHz, while the RF domain is on the order of 250 MHz. The propagation velocity of sound is on the order of 330 meters/second compared to the speed of light at $3 \times 10^8$ meters/s. In the case of an acoustic noise canceller system, the signal travels through the electronics of the system much faster than the sound between the reference microphone and the speaker output. In the electromagnetic wave canceller scenario, the signal propagation time through the electronics is typically slower than from the coupler to the receive antenna, which therefore necessitates differences in the implementation of the canceller architecture.

Accordingly, there exists a need to overcome an electromagnetic wave jamming signal being emitted from a platform so that the jamming signal does not interfere with wireless communications to the platform.

SUMMARY

The present disclosure relates to an adaptive canceller system for canceling an EMI signal, from a broadband signal being received by a receiver. In one implementation the system includes an adaptive canceller subsystem having first and second inputs, and an output. The first input of the adaptive canceller subsystem receives a sample of the EMI signal from a high power interference source, and the second input, termed the "error signal" input, receives a sample of a signal, which is a sum of the desired received communications signal, a transformed version of the high-power interference signal, and an applied correction signal from the adaptive canceller. The transformed signal is the high-power interference signal after it passes through the propagation channel between the jammer antenna and the broadband signal receive antenna. The adaptive canceller subsystem generates a correction signal that is an inverse of the transformed high-power interference signal component. The correction signal is applied to the input of the combined transformed interference signal and the broadband receive signal to cancel the EMI signal component from the received broadband signal. A time delay is applied to the error signal so that the system will remain causal, and will be able to cancel a wideband interference signal. An automatic gain control (AGC) circuit may be applied to the error signal input. This AGC circuit adjusts the amplitude of the error signal so that it remains in the mid range of the following analog to digital (A/D) converter to provide adequate dynamic range for the operation of the adaptive filter.

In one specific implementation, the system is employed on a mobile platform that includes a jamming pod that forms the high-power interference signal source. A separate antenna is used to receive the combined communications signal and the transformed interference signal. In one form the mobile platform comprises an aircraft.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
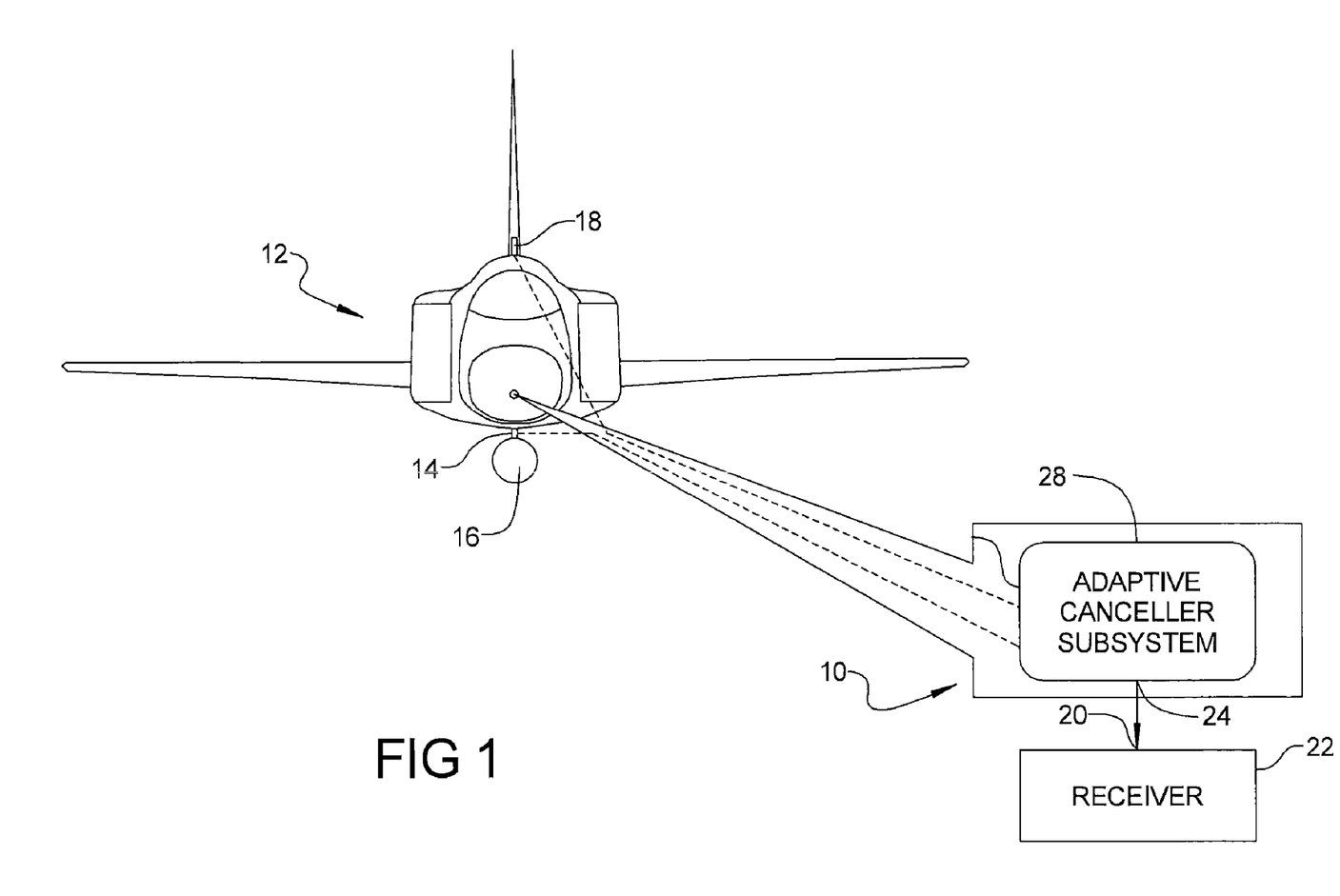
FIG. 1 is a front view of a mobile platform incorporating an embodiment of an adaptive canceller system of the present disclosure.

Referring to FIG. 1, there is illustrated an adaptive electromagnetic wave interference (EMI) canceling system 10 (hereinafter the "adaptive canceller system 10") incorporated on a mobile platform 12. In this example the mobile platform 12 forms an aircraft, and will be referred to throughout the following discussion as "aircraft 12". However, the system 10 may be implemented on any form of stationary or mobile platform, such as a bus, train, or any other form of land vehicle, or potentially on any form of marine vehicle. The system 10 could also be implemented on space vehicles or on virtually any type of airborne platform, whether manned or unmanned, or on rotorcraft. The system 10 is expected to find particular utility on military aircraft that incorporate electronic jamming equipment that emit an EMI jamming signal to jam enemy radar and communications. Such aircraft typically also include EM wave transceivers that enable two-way communications with other mobile platforms or with EM wave transceivers at terrestrial locations.

Referring further to FIG. 1, the system 10 in this example is carried on the aircraft 12 and includes a coupler 14 for directly receiving a jamming signal emitted from a jamming pod 16. The coupler 14 produces a replica of the interference signal used by the adaptive canceller system 10. The coupler 14 may be a direct tap of the signal from a jammer power amplifier (as shown) associated with the jamming pod 16, or it may be an antenna closely positioned to the jamming pod 16 so that it receives a good replica of the transmitted jammer signal. The system is also connected to a communication antenna 18, in this example a broadband communications In the example implementation of FIG. 1, the jamming pod 16 is shown mounted below the fuselage. In other configurations, the jamming pod 16 could be mounted below the wing. The configuration of FIG. 1 shows the communication antenna 18 mounted on the top of the fuselage. In other configurations, it could be mounted in a different location. The key is that it be mounted some distance away from the jamming pod 16. With this arrangement, the communications antenna 18 will typically pick up the jamming signal being emitted from the jamming pod 16, and this interfering signal component will thus be received together with the communications signal. Typically, the magnitude of the EMI jamming signal is on the order of many times that of the communications signal that the antenna 18 is receiving. This makes reception of the communications signal challenging.

Figure 2:
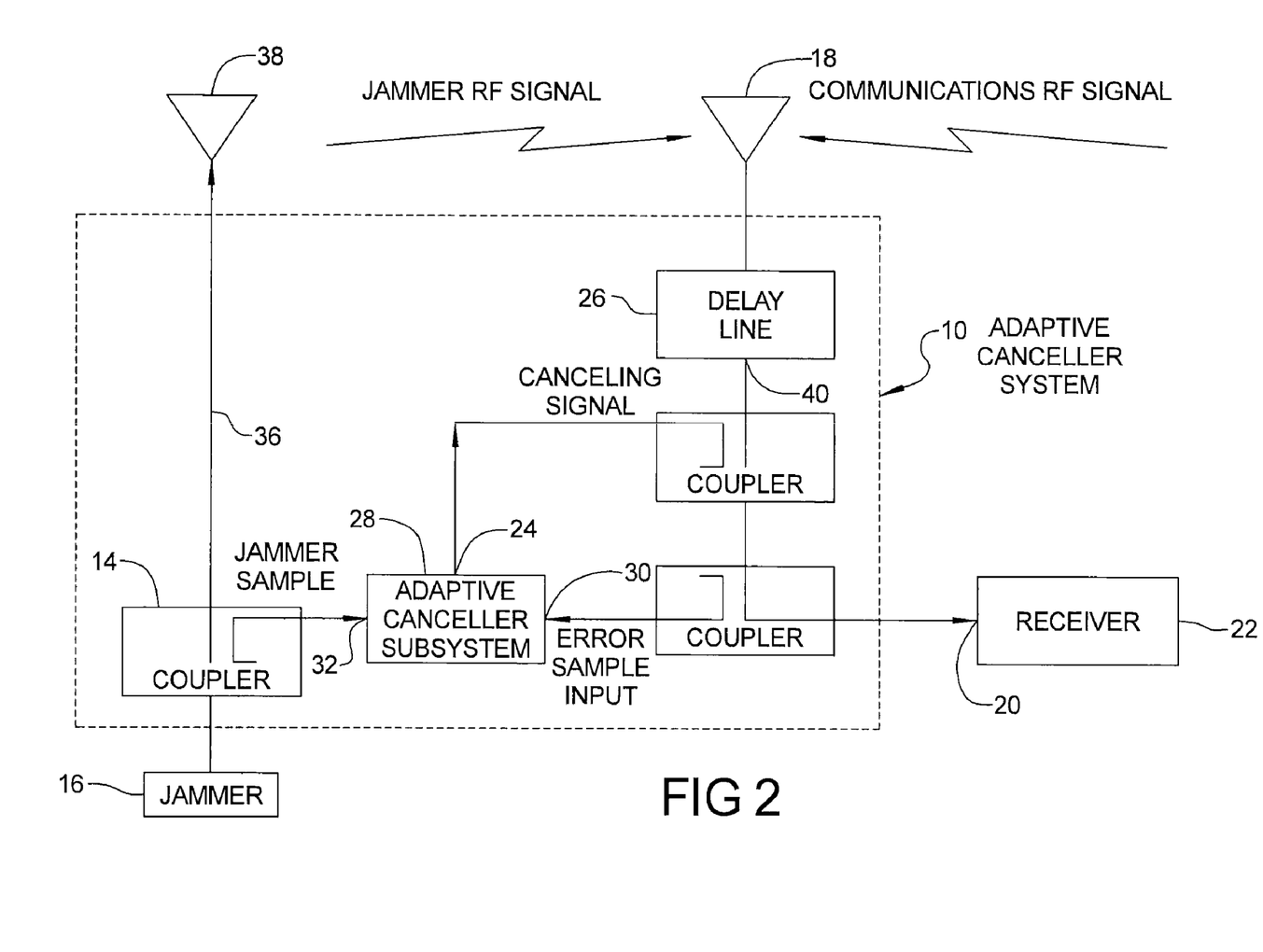
FIG. 2 is a simplified, high level block diagram of the adaptive canceller system of FIG. 1.

Referring to FIG. 2, a block diagram of the system 10 is illustrated. The system 10 incorporates a time delay stage 26 that is connected to the communications antenna 18 The time delay stage 26 may be formed by a wire or fiber-optic delay line. The amount of time delay will depend on the specific configuration of the jammer component and the specific type of aircraft, and is also dependent on the length of the propagation channel between the interfering device (in this example jamming pod 16) and the communications receive antenna(s). The delay may typically be on the order of 100 nano-seconds.

The system 10 further includes the adaptive canceller subsystem 28. The adaptive canceller subsystem 28 has an input 30 that receives a sample of the error signal. It will be appreciated that the broadband signal includes a component that represents the jamming signal emitted from the jamming pod 16, and a broadband signal component that a receiver 22 is receiving from a remote source.

The adaptive canceller subsystem 28 further includes an input 32 that directly receives a portion of the jamming signal generated by the jamming pod 16 via the coupler 14. The coupler 14 may incorporate a signal splitter coupled to an output line 36 of the jamming pod 16 as mentioned above or, signal coupling may be formed by a separate antenna that is positioned closely adjacent an antenna 38 associated with the jamming pod 16 that is being used to emit the EMI jamming signal.

The output 24 of the adaptive canceller subsystem 28 is coupled to the signal line from the receive antenna 18 to the receiver 22. Accordingly, the adaptive canceller subsystem 28 forms a portion of a closed loop system where the input 30 continuously receives what amounts to a feed/back error signal, and where the feedback portion of the signal is a sample of the broadband signal being received by the antenna 18.

The time delay stage 26 is important in enabling a suitable time delay to be implemented so that the propagation time of the baseband signal between the communications receive antenna 18 and an input 20 of the receiver 22 can be lengthened. The increased propagation time caused by the time delay stage 26 allows for analysis of the baseband signal and the processing of an error correction signal that effectively is the inverse of the interfering signal component present within the received baseband signal.

Figure 3:
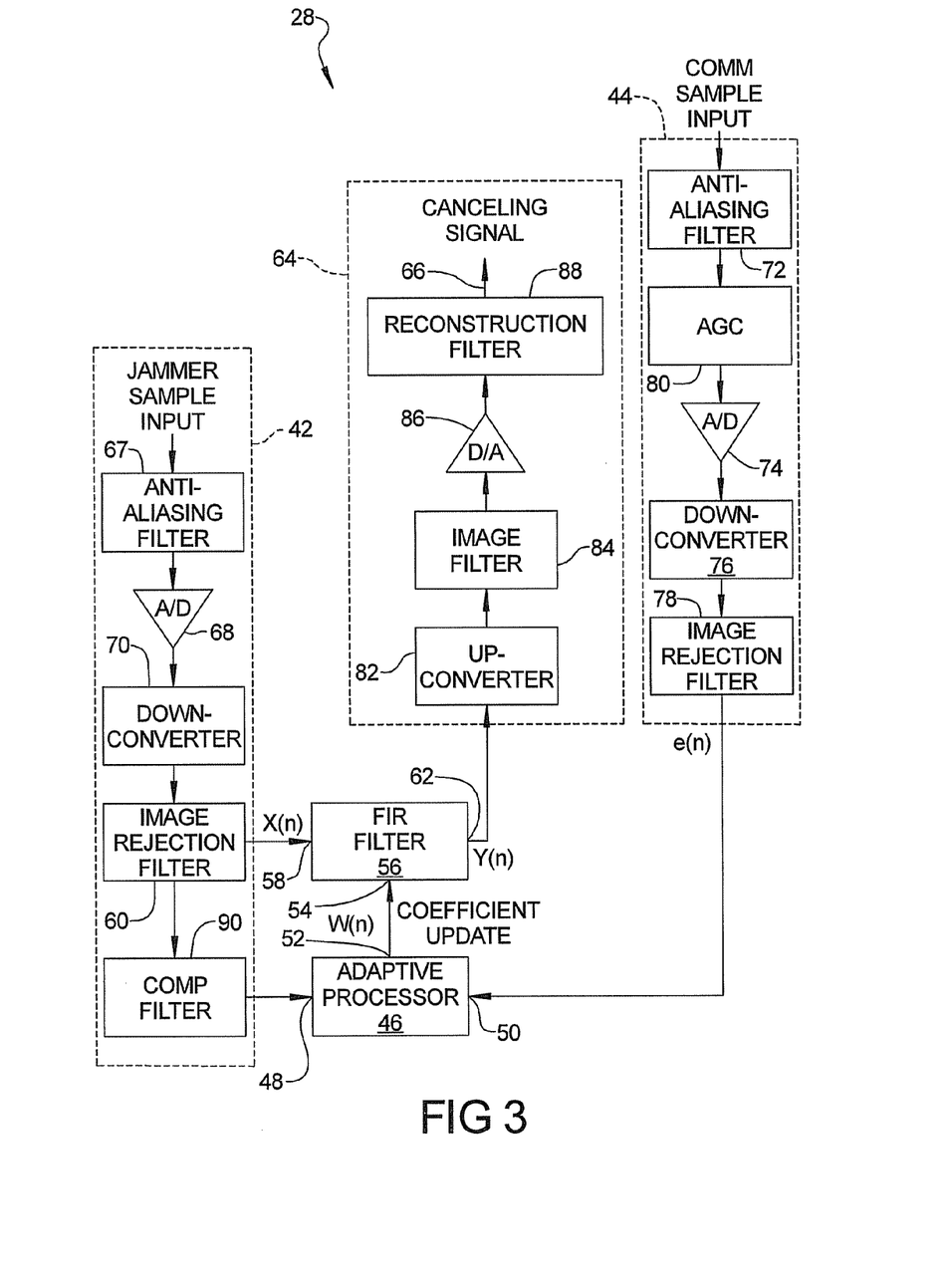
FIG. 3 is a block diagram of the adaptive canceller subsystem of FIG. 2.

Referring to FIG. 3, a detailed block diagram of one embodiment of the adaptive canceller subsystem 28 is shown. The adaptive canceller subsystem 28 may include a first or "jamming" input channel 42 for receiving a sample of the jamming signal generated by the jamming pod 16. A second or "sample broadband" input channel 44 receives a sample of the received broadband signal. Again, it will be understood that the received broadband signal includes an interfering signal component, which essentially is a portion of the jamming signal from the jamming pod 16, as well as a broadband signal being received from some external signal source.

An adaptive processor 46 has a first input 48 that receives an output from the first input channel 42, and a second input 50 that receives an output from the second input channel 44. An output 52 of the adaptive processor 46 is coupled to a first input 54 of a finite impulse response (FIR) filter 56. The output 52 of the adaptive processor provides a set of updated filter coefficients to the FIR filter 56. The FIR filter 56 has a second input 58 that receives a signal from an image rejection filter 60 of the first channel 42. The FIR filter 56 also has an output 62 that provides an output signal to an output channel 64. An output signal 66 from output channel 64 forms a canceling or "correction" signal that is the inverse of the jamming signal component picked up by the broadband communications antenna 18.

With further reference to FIG. 3, the first input channel 42 includes an anti-aliasing filter 67. The anti-aliasing filter 67 provides an output to an analog-to-digital (A/D) converter 68 that generates a digital signal that is applied to an input of a down-converter 70. The down-converter 70 converts the digital signal to a baseband representation. The baseband representation is then fed into the image rejection filter 60 that produces a complex baseband representation of the jamming signal (denoted by "X(n)")

With further reference to FIG. 3, the second input channel 44 is similar in construction to the first input channel 42 and functions similar to the first channel 40 to produce a complex baseband representation of an error signal (denoted as "e(n)"). The second input channel 44 includes an anti-aliasing filter 72, an A/D converter 74, a down-converter 76 and an image rejection filter 78. In addition, the second input channel 44 includes an automatic gain control (AGC) circuit 80 interposed serially between the anti-aliasing filter 72 and the A/D converter 74. The automatic gain control circuit 80 functions to monitor the magnitude of the sample baseband signal and to automatically scale the signal so that the error signal e(n) is maintained at a magnitude that makes full use of the entire range of the A/D converter 74. Without the automatic gain control circuit 80, as the error signal e(n) is driven to zero by the system 10, only a few of the least significant bits of the A/D converter 74 would eventually be registering an output. Accordingly, the automatic gain control circuit 80 enables a high level of resolution and accuracy to be obtained in processing the error signal e(n).

The output signal X(n) from the first input channel 42 is filtered using the FIR filter 56 that effectively models the propagation channel between the coupler 14 and the broadband communications antenna 18. The result is that the reference jamming signal from the coupler 14 is filtered by a replica of the propagation channel so that the signal at the output of the filter is effectively a replica of the jamming signal that is received at the communications antenna. The output of the FIR filter 56, "Y(n)", is the inverse of the interference signal at the broadband communications antenna 18. The output signal Y(n) is up-converted using an up-converter 82 and filtered using an image rejection filter 84. The digital signal Y(n) is then reconstructed as an analog signal using a D/A converter 86. The reconstructed analog output signal from the D/A converter 86 is then filtered again using a reconstruction filter 88. The reconstruction filter band limits the output from the D/A converter 86 and also applies a spectral correction to account for the spectral roll-off due to the sampled nature of the D/A converter. The output (represented by signal line 66) from reconstruction filter 88 is then coupled to the line from the broadband communications antenna 18 to the receiver 22.

In one implementation, the adaptive processor 46 may comprise an LMS ("least means squared") processor that implements an LMS algorithm to compute the coefficients for the FIR filter 56, and adapts to changes in the jamming signal processed by input channel 42 and the error signal e(n) from sample baseband signal input channel 44. Of course, other known, suitable adaptive processing algorithms may exist that might be suitable for use in place of an LMS algorithm.

With further reference to FIG. 3, a compensation filter 90 is implemented to compensate for the effects of the secondary path transfer function from Y(n) to e(n). The secondary path transfer function includes the transfer through the output reconstruction filter 88 and the D/A converter 86 and the A/D sampling of the error signal e(n) and its conversion to a baseband representation (via components 68 and 60, respectively).

Figure 4:
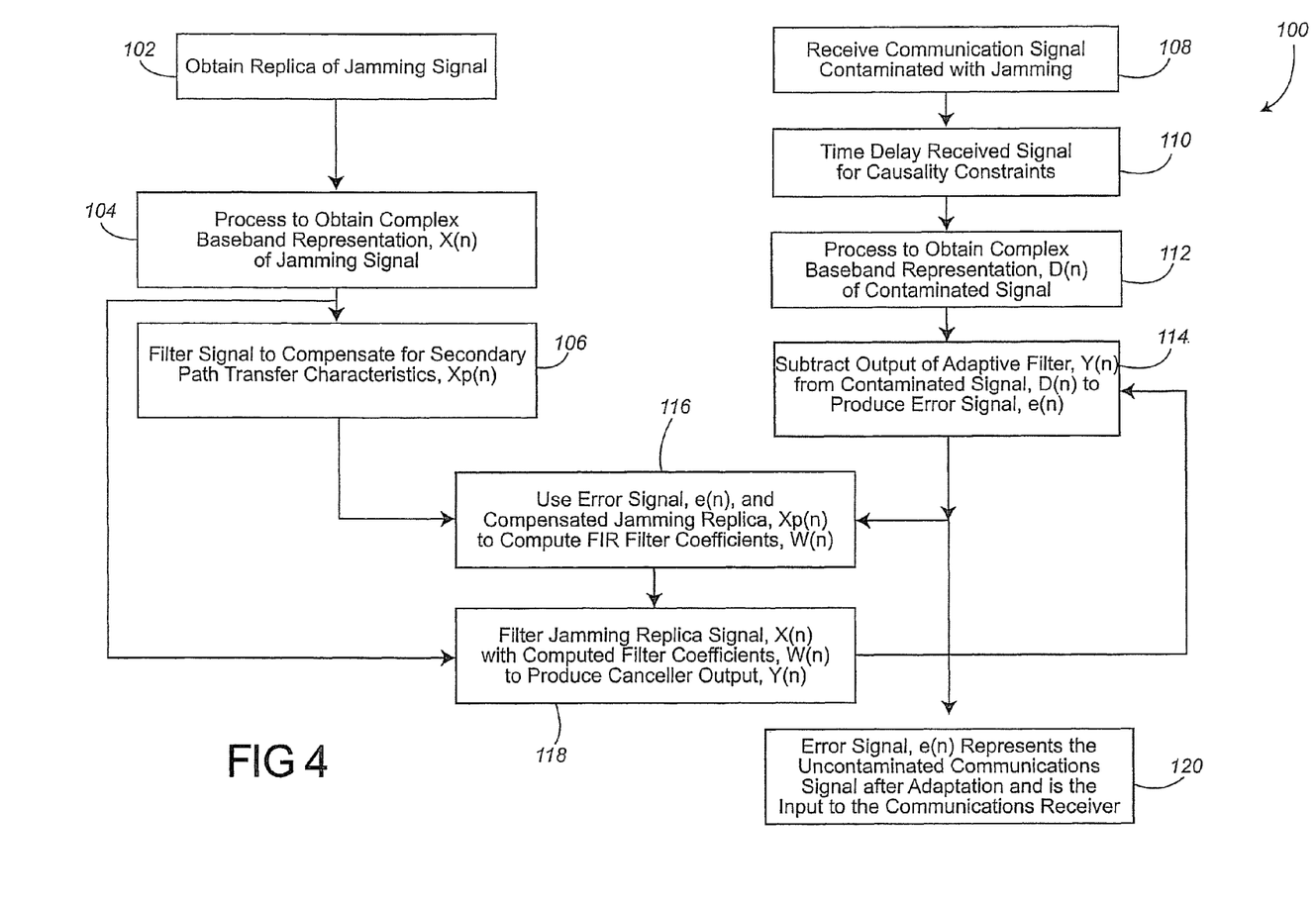
FIG. 4 is a flowchart of major operations of the adaptive canceller system of the present disclosure.

With brief reference to FIG. 4, a flowchart 100 summarizing exemplary operations performed by the system 10 is shown. At operation 102, a sample (i.e., replica) of the jamming signal from jamming pod 16 is obtained. At operation 104, the replica of the jamming signal is processed to obtain the complex baseband representation X(n) of the sampled jamming signal. At operation 106, the complex baseband signal is filtered to compensate for secondary path transfer characteristics to produce a compensated jamming replica signal Xp(n).

Operations 108-114 are performed substantially simultaneously with operations 102-106. At operation 108, the communication signal contaminated with the jamming signal is obtained. At operation 110, the signal received at operation 108 is time delayed for causality constraints. At operation 112, the time delayed signal from operation 110 is processed to obtain the complex baseband representation, D(n) of the contaminated signal. At operation 114, the output Y(n) of the adaptive FIR filter 56 is subtracted from the contaminated signal D(n) to produce the error signal e(n).

At operation 116, the error signal e(n) and the compensated jamming replica Xp(n) are used to compute the new FIR filter coefficients W(n) for the FIR filter 56. At operation 118, the jamming replica signal X(n) from operation 104 is filtered with the computed filter coefficients W(n) to produce the canceller output Y(n). This output is fed back to operation 114. At operation 120, the error signal e(n) from operation 114 represents the uncontaminated communications signal after adaptation, and is used as the input signal to the receiver portion of the communications receiver 22 (FIG. 1).

Figure 5:
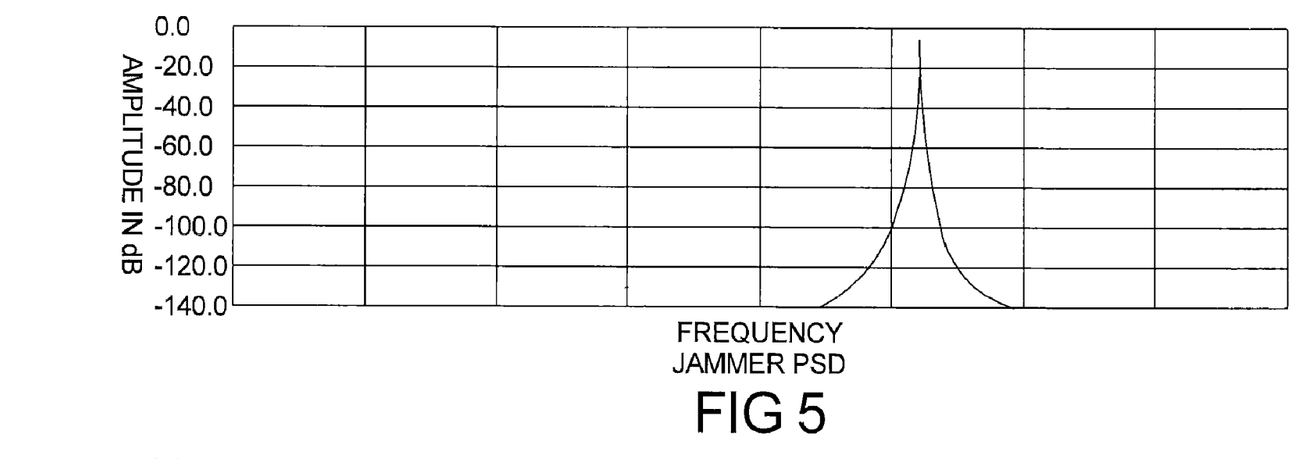
FIG. 5 is a plot of the power spectral density (PSD) of the jamming signal.
Figure 6:
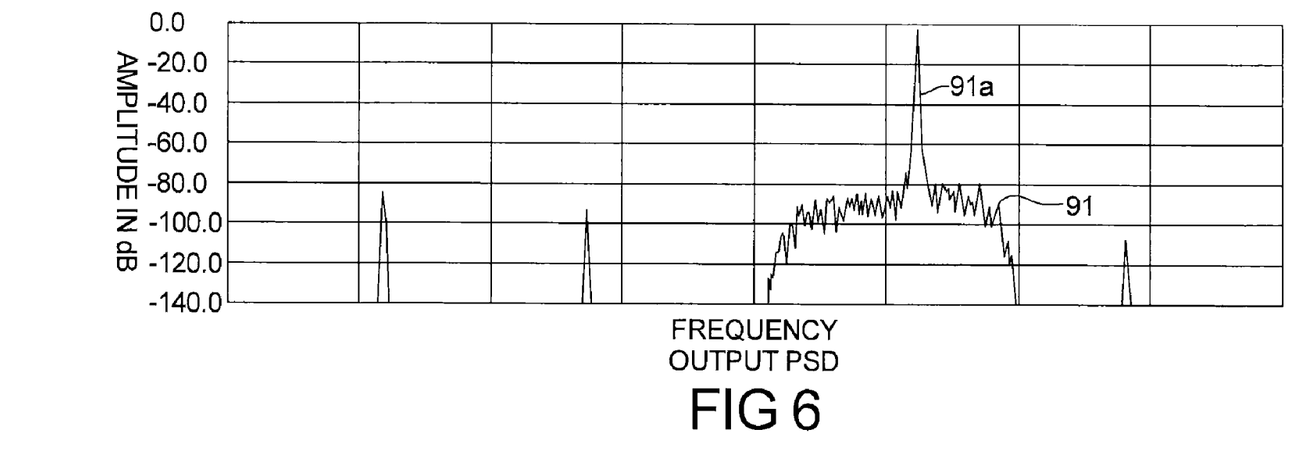
FIG. 6 is a plot of the output signal PSD of the adaptive canceller subsystem shown in FIGS. 2 and 3.

Referring to FIGS. 5-8, simulations of performance of the system 10 are provided. FIG. 5 illustrates the power spectral density (PSD) of the jamming sample signal X(n) at an exemplary selected L-band frequency FIG. 6 illustrates the output PSD of the interference canceling output generated by the reconstruction filter 88 (FIG. 3). The broad hump 91 represents the thermal noise in the signal band of interest. The attenuation of the signal outside of the band is due to the anti-aliasing filter. The side tones that appear are the result of non-perfect image filtering in the down-conversion process. The large tone inband 91a is the canceling signal, and is the inverse of the jamming signal received by the communication antenna 18.

Figure 7:
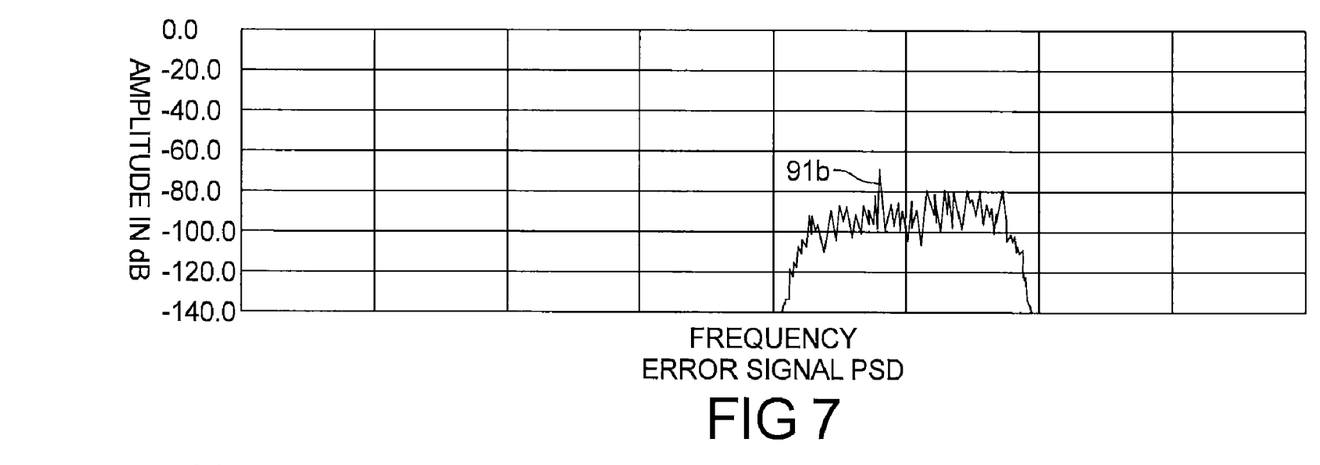
FIG. 7 is a plot of the error signal PSD that is one of the inputs to the adaptive canceller subsystem.

FIG. 7 illustrates the PSD of the output error signal e(n) after adaptation from the sample broadband channel 44 (FIG. 3). This is the error signal applied to the input 50 of the adaptive processor 46, and is also the input signal to the communications receiver 22. Again, note the inband thermal noise. Also note the inband tone 91b. That represents the communication signal. This output shows that the jamming signal has been effectively removed from the signal that is input to the receiver 22, and the receiver can operate normally with the received communications signal.

Figure 8:
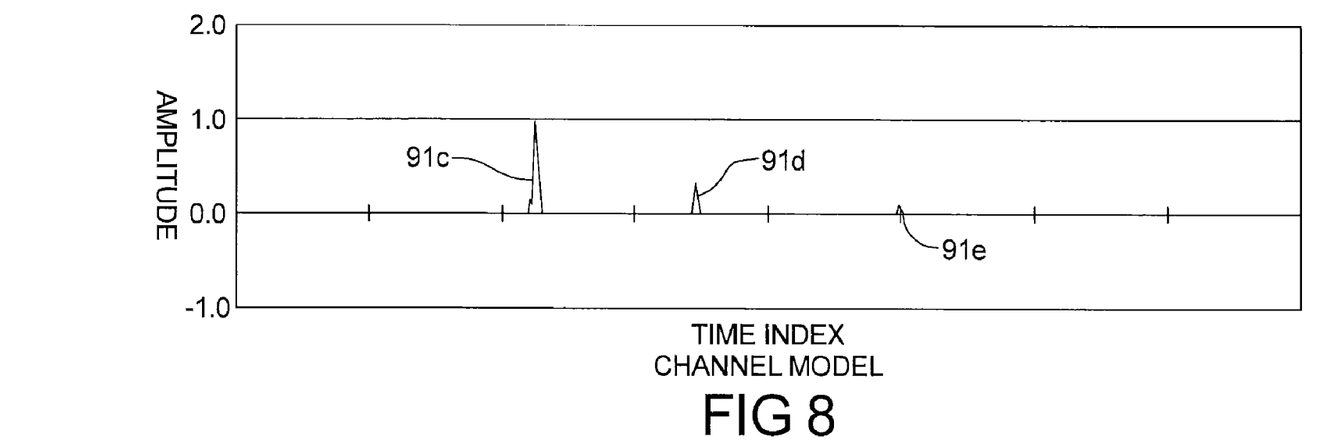
FIG. 8 is a plot of the simulated channel model representing the RF propagation path between the high-power jammer antenna and the receive antenna for the RF communication system.

FIG. 8 illustrates the PSD output of the channel model. This is a simple simulated channel propagation model for the propagation channel between the jamming pod 16 antenna and the communication receive antenna 18. It shows that the jammer signal 91c is received at some time delay, and also shows two multi-path reflections (91d and 91e) of the jammer signal being received at the communications antenna 18. It will be appreciated that the actual propagation is likely to be much more complex than this, but FIG. 8 is intended to only present a simulation of a highly simplified channel propagation model.

From the foregoing, it will be appreciated that while general adaptive processing has been used in the past in acoustic noise canceling applications, these prior applications were generally not able to address noise cancellation with EM wave signals. This is because in acoustic applications the bandwidths are much smaller than those involved with EM wave applications, With the present application, two highly advantageous factors in making adaptive noise canceling effective for use in the RF domain and the canceling of a high-power jamming signal are the added delay and the addition of an automatic gain control (AGC) 80 to the error signal input. The added delay makes the overall system causal and allows operation against wideband EMI jamming signals. The use of the AGC 80 with the error signal input is useful, because, the system 10 has had a chance to adapt and cancel the jamming signal, the error signal is relatively large. After adaptation the signal is relatively small. The implementation of the AGC 80 enables the system 10 to work over the large dynamic range of this signal. While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An adaptive canceller system for canceling an electromagnetic interference (EMI) signal component generated from an EMI signal source, from a broadband signal being, wherein the broadband signal and EMI signal component are received together via an antenna feeding a receiver, said system comprising:
   an adaptive canceller subsystem including:
      an adaptive processor having first and second inputs, and an output, the output of the adaptive processor representing a set of control inputs;
      a filter having a first input for receiving the EMI signal, and a second input for receiving the set of control inputs for configuring the filter;
   a time delay stage having an input for receiving said broadband signal and producing a delayed broadband signal, and an output in communication with an input of said receiver;
   said first input of said adaptive processor adapted to receive said EMI signal and said second input of the adaptive processor adapted to receive a sample of said delayed broadband signal, and the adaptive processor using the EMI signal and the broadband signal to generate the set of control inputs for the filter, the filter using the control inputs to generate a correction signal that is an inverse of said EMI signal component, and that is applied to said input of said receiver to cancel said EMI signal component from said broadband signal.

2. The system of claim 1, wherein said adaptive canceller subsystem comprises an automatic gain control circuit for controlling a gain of said sample of said delayed broadband signal being processed.

3. The system of claim 1, wherein said EMI signal source comprises a jamming system that generates a jamming EMI signal.

4. The system of claim 1, wherein said broadband signal comprises a signal adapted for use with a broadband communications radio receiver.

5. The system of claim 1, wherein said time delay stage is in communication with an output of an antenna that receives said broadband signal.

6. The system of claim 1, wherein said system forms a closed loop system adapted to adjust to a changing level of said sample of said broadband signal.

7. A method for generating an electromagnetic wave (EMI) correction signal to compensate for EMI interference generated from an EMI signal source that affects a broadband signal being received by a receiver, said method comprising:
   directly receiving an EMI signal generated by said EMI signal source;
   receiving said broadband signal, said broadband signal representing a composite signal including an EMI signal component caused by said EMI signal source, and a broadband signal component;
   using a time delay stage to impart a time delay to said broadband signal; and
   processing said directly received EMI signal and said time delayed broadband signal to generate an EMI correction signal that is the inverse of said EMI signal component; and
   wherein said processing operation further comprises obtaining a sample of said time delayed broadband signal and controlling a gain of said sample.

8. The method of claim 7, further comprising the operation of applying said EMI correction signal to said broadband signal prior to said broadband signal being received by said receiver, to thus cancel said EMI signal component from said broadband signal.

9. The method of claim 7, wherein controlling a gain of said sample comprises using an automatic gain control subsystem.

10. The method of claim 7, wherein said processing operation forms a closed loop processing operation that adjusts to changes in a magnitude of said time delayed broadband signal.

11. A method for canceling an interfering electromagnetic wave (EMI) signal generated from an EMI signal source, from a broadband signal being received by a receiver, said method comprising:
   directly receiving said EMI signal;
   receiving said broadband signal, said broadband signal representing a composite signal including an EMI signal component caused by said EMI signal source, and a broadband signal component;
   using a time delay stage to impart a time delay to said broadband signal;
   obtaining a sample of said time delayed broadband signal;
   processing said directly received EMI signal and said time delayed sample of said broadband signal to generate an EMI correction signal, said EMI correction signal forming an inverse of said EMI signal component; and
   applying said EMI correction signal to said broadband signal to cancel said EMI signal component therefrom.

12. The method of claim 11, further comprising automatically controlling a gain of said sample of said time delayed broadband signal.

13. The method of claim 11, wherein directly receiving said EMI signal comprises directly receiving an electromagnetic wave jamming signal transmitted from a first antenna on a mobile platform.

14. The method of claim 13, wherein receiving said broadband signal comprises receiving said broadband signal using a second antenna mounted on said mobile platform.

15. The method of claim 11, wherein the operation of applying said EMI correction signal comprises applying said EMI correction signal to said broadband signal after said broadband signal has passed through said time delay stage.

16. The method of claim 11, wherein said method forms operates as a closed loop system that automatically adapts to a changing level of said time delayed sample of said broadband signal.

* * * * *